United States Patent
Alstrin et al.

(10) Patent No.: US 6,842,312 B1
(45) Date of Patent: Jan. 11, 2005

(54) DUAL STRIPE READ HEAD WITH MAGNETIC SUPPORT STRUCTURES WHICH PROVIDE A UNIFORM MAGNETIC FIELD FOR STABILIZATION DURING MANUFACTURE

(75) Inventors: April Lynn Alstrin, Boulder, CO (US); Steven Castle Sanders, Louisville, CO (US); Francis Xavier Campos, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 106 days.

(21) Appl. No.: 10/179,443

(22) Filed: Jun. 25, 2002

(51) Int. Cl.[7] .................................................. G11B 5/39
(52) U.S. Cl. .................... 360/315; 360/316; 360/327.22
(58) Field of Search ................................ 300/315, 316, 300/321, 327.22

(56) References Cited

U.S. PATENT DOCUMENTS

| | | | | |
|---|---|---|---|---|
| 5,428,491 A | * | 6/1995 | Smith | 360/327.31 |
| 5,956,215 A | * | 9/1999 | Schmalhorst et al. | 360/315 |
| 6,002,554 A | * | 12/1999 | Schmalhorst et al. | 360/316 |
| 6,038,108 A | * | 3/2000 | Dee et al. | 360/121 |

* cited by examiner

Primary Examiner—Craig A. Renner
(74) Attorney, Agent, or Firm—Yee & Associates, P.C.

(57) ABSTRACT

A method for stabilizing magnetic domains in dual stripe magnetic read heads is provided. This method first comprises providing a plurality of coupled magneto-resistive read elements in a spaced relationship. These read elements include top and bottom patterned magnetic shields on ceramic substrates, with two magneto-resistive (MR) sensor elements between the shields, all separated by insulating layers. Magnetic support structures are provided adjacent and separated from the coupled read elements, wherein the magnetic support structures provide a uniform magnetic field that stabilizes the magnetic domains of the MR sensors in the coupled read elements.

14 Claims, 2 Drawing Sheets

DUAL STRIPE READ HEAD WITH MAGNETIC SUPPORT STRUCTURES WHICH PROVIDE A UNIFORM MAGNETIC FIELD FOR STABILIZATION DURING MANUFACTURE

BACKGROUND OF THE INVENTION

1. Field of the Invention

The present invention relates generally to magnetic read heads, and more specifically to stabilizing magneto-resistive sensors.

2. Background of the Invention

There are several ways to fabricate magneto-resistive (MR) sensors for read back of data on magnetic tape. A bias method is used in order to permit the sensor to operate in the linear portion of the MR curve. In some cases, two elements can be used at the same time, reading the same data, to reduce signal distortion. This is accomplished by processing the signal differentially so that any nonlinearities arising from the shape of the MR curve are canceled out.

In a coupled element design, the two elements may be placed atop each other in close proximity. This allows the sensors to provide magnetic bias for each other, as well as providing the benefits of differential sensing. The design has an added benefit of high output, since two elements occupy the same space that one element would occupy under normal circumstances.

One of the difficulties in making coupled element sensors is that for high linear densities, gap lengths must be made very small. Therefore, the films that make up the MR sensors are separated by a very thin insulator. Furthermore, because of the stacked nature of the design, all interconnection metallization must traverse steps where one material ends, and insulating material tends to become thinner.

The use of cobalt zirconium tantalum (CZT) shields on aluminum-titanium-carbide (AlTiC), instead of ferrite, creates problems with magnetic domain asymmetry and stability. The magnetic domains are unstable and have a tendency to form domain walls in inappropriate geometries. In other words the location of domain walls of the magnetic structure is not constant or repeatable.

There is always at least one magnetic domain associated with a magnetic structure. The key to stability is to make sure that the location of the domain wall does not move around and is predictable. Some types of read heads have active stabilization of magnetic domains, using permanent magnets, exchange coupling, and/or gratings. However, dual stripe read head designs do not have active stabilization. It is extremely difficult to use active stabilization on dual stripe heads and is not considered "manufacturable" within the industry. Currently, dual stripe heads do not have any intentional passive stabilization built into them.

Therefore, it would be desirable to have a method for passively stabilizing magnetic domains for dual stripe MR multi-track tape heads.

SUMMARY OF THE INVENTION

The present invention provides a method for stabilizing magnetic domains in dual stripe magnetic read heads. This method first comprises providing a plurality of coupled magneto-resistive read elements in a space relationship. These read elements include top and bottom patterned magnetic shields on ceramic substrates, with two magneto-resistive (MR) sensor elements between the shields, all separated by insulating layers. Magnetic support structures are provided adjacent and separated from the coupled read elements, wherein the magnetic support structures provide a uniform magnetic field that stabilizes the magnetic domains of the MR sensors in the coupled read elements.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
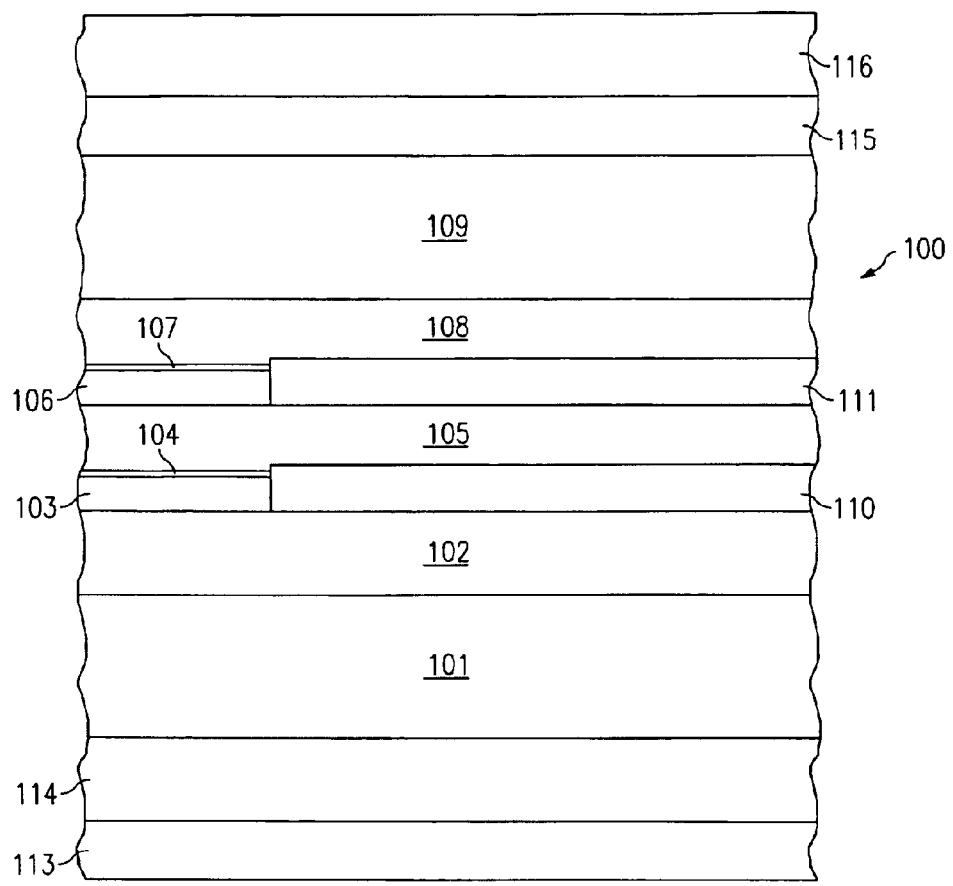
FIG. 1 depicts a cross-sectional diagram of a read head coupled element in which the present invention may be implemented.

Referring to FIG. 1, a cross-sectional diagram depicts a read head coupled element in which the present invention may be implemented. This coupled element may be used in a multi-track coupled-element read head. The interface with a magnetic tape would be on the left side of the coupled element 100 depicted in FIG. 1.

As depicted in FIG. 1, coupled element 100 includes a magnetically shielding layer 101 with an insulating layer 102 deposited thereon. In prior read head designs, the magnetically shielding layer 101 also serves as the substrate for the device and is typically composed of ferrite. For the new thin film shielded readers, the shielding layer 101 is a patterned magnetic layer made of mechanically hard magnetic materials such as cobalt zirconium tantalum (CZT), nickel iron (NiFe), iron nitride (FeN), or sendust (a magnetic alloy composed primarily of iron with some silicon and aluminum).

The present invention applies to read head designs that utilize patterned blob magnetic shields on ceramic substrates. The shield 101 is separated from the ceramic substrate 113, typically aluminum titanium carbide (AlTiC), by a thick insulating underlayer 114 such as aluminum oxide. As explained below, differences in shielding material and geometries cause different magnetic fields to be exerted during deposition of the magnetoresistive (MR) sensor layers.

The insulating layer 102 is preferably aluminum oxide or other similar material, such as silicon nitride, known in the art for use as an insulating layer in thin film recording heads.

Coupled element 100 also includes a MR sensor element 103 patterned on the insulating layer 102. MR sensor element 103 comprises a MR material and is the key functional portion of a read element. The sensor 103 can be formed according to several techniques known in the art, e.g., deposition, photolithographic patterning, and etching of a known MR material, which may be a nickel-iron alloy such as permalloy.

A metal cap 104 is placed over the MR sensor element 103 and may be composed of materials such as titanium or tantalum. The metal cap 104 controls magnetostriction and protects the MR material in sensor 103 from further processing.

Coupled element 100 includes a second thin insulating layer 105 deposited on the capped MR sensor element 103. Like insulating layer 102, layer 105 is preferably composed of aluminum oxide or a nitride.

A second sensor element 106 is then formed on the second insulating layer 105. As with MR sensor element 103, sensor element 106 comprises a MR material and is the second functional stripe in a dual stripe MR sensor read head. In that regard, first and second MR sensor elements 103 and 106 together form the coupled element.

Similar to MR sensor element 103, MR sensor element 106 is covered with a metal cap 107 composed of titanium or tantalum.

Coupled element 100 further includes metallized connecting leads, 110 and 111, which are preferably composed of highly conductive materials such as copper or gold. These leads may be formed by conventional processes, e.g., photolithography, sputter deposition, evaporation, electrochemical plating, and etching. The connecting leads 110 and 111 function as conductors of current to the MR sensor elements 103 and 106 respectively. A third conductor, not shown, serves as a common conductor to carry current away from both sensor elements 103 and 106.

A final insulating layer 108, again preferably aluminum oxide or silicon nitride, is deposited over the second capped MR sensor 106 and connecting leads 110 and 111.

To complete the coupled element 100, a magnetic shield 109 is placed on top. In prior head designs, the shield 109 is a closure piece made of a magnetic material such as ferrite. In the case of thin-film shields, hard magnetic materials such as CZT or NiFe are patterned above insulating layer 108, and encapsulated by a thick insulating overcoat 115 such as aluminum oxide, and then a nonmagnetic closure 116 such as AlTiC may be added. Such shield layers are deposited and patterned using standard processing techniques well known in the art.

Figure 2:
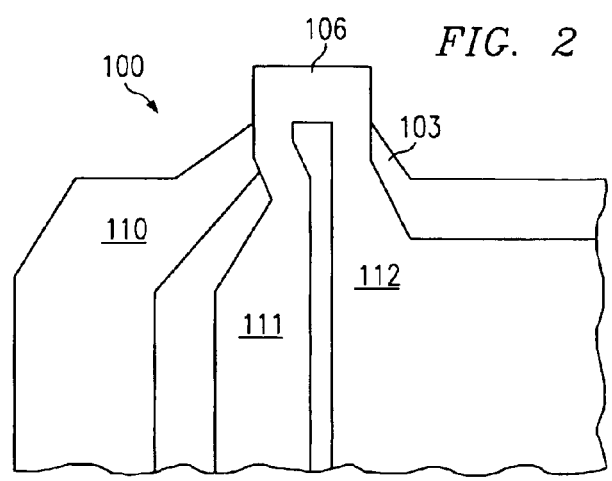
FIG. 2 depicts a top plan view schematic diagram illustrating the coupled element in FIG. 1.

Referring now to FIG. 2, a top plan view schematic diagram illustrating the coupled element in FIG. 1 is depicted in accordance with the present invention. FIG. 2 depicts the coupled element 100 prior to the addition of the top magnetic shield 109 from FIG. 1.

MR sensor 106, being the top sensor, is clearly depicted in FIG. 2. Because MR sensor 103 is below sensor 106, it is substantially covered by sensor 106 and therefore is not as clearly illustrated in FIG. 2.

MR sensor elements 103 and 106 each include leg sections which function as connection points for the conducting leads 110, 111, and 112. Current through MR sensor 103 flows along conductor 110, through the sensor 103, and out along conductor leg 112. Current through MR sensor 106 flows along conductor 111, through the sensor 106, and out along conductor leg 112. Conductor leg 112 is known as a common leg because it carries current from both sensors 103 and 106.

As mentioned above, when switching from ferrite shields to patterned thin-film shields, different magnetic fields are exerted on the MR layers during manufacture, which in turn results in asymmetry and instability in the magnetic domains of the read head. To understand the problem of stability, it is necessary to examine the different magnetic fields that MR sensors experience during processing.

With previous ferrite shielded readers, the MR deposition is done within a heated, magnetic orienting field. In this process, the ferrite (a magnetic material) is heated above its Curie temperature so that the only magnetic field the sensor experiences during deposition comes from the deposition tool itself. Thus, the MR material is deposited in a uniform, well-controlled magnetic field, and then patterned. The second MR sensor deposition is also done in a heated, magnetic orienting field. However, the second MR film experiences magnetic fields from both the deposition tool and a small contribution from the first patterned MR layer. After the second MR deposition, the MR sensor elements are not exposed to any other significant external magnetic fields during processing.

Read heads using patterned thin film shields, e.g., CZT, experience very different magnetic fields during MR deposition and subsequent processing. Unlike ferrite shields, the patterned bottom shield made of a magnetic material perturbs the uniform field applied by the deposition tool, thereby creating a non-uniform magnetic field across the substrate. The MR deposition is done in an ambient, magnetic orienting field.

During the deposition of the first MR layer, there are two magnetic fields influencing the MR film: a magnetic orienting field from the deposition tool itself, and a second field exerted by the thin film shield. The deposition of the second MR layer occurs under the superposition of additional magnetic fields. These fields come from the deposition tool, the patterned bottom shield, and the patterned first MR layer. In addition, both MR sensors are influenced by a strong external magnetic field during the required anneal of the top magnetic shielding material.

In order to create more stable magnetic domains for read heads with thin film shields, such as CZT, the present invention provides a method for producing more uniform magnetic fields similar to those the sensor experiences during a ferrite reader manufacturing process.

Figure 3:
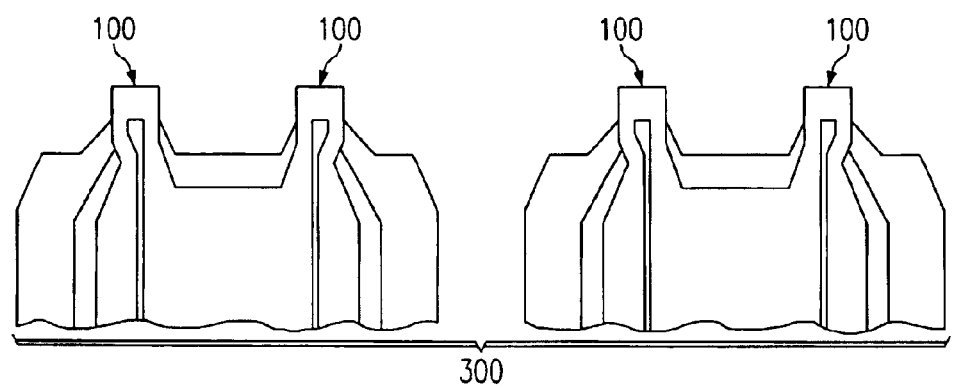
FIG. 3 depicts a top plan view schematic diagram a multi-track coupled-element read head in which the present invention may be implemented.

Referring to FIG. 3, a top plan view schematic diagram depicts a multi-track coupled-element read head in which the present invention may be implemented. The top thin film shield structures are not shown for purposes of clarity. The read head 300 includes a plurality of coupled elements 100 disposed in a spaced relationship to each other. The coupled elements 100 are the same as coupled element 100 depicted in FIGS. 1 and 2. In that regard, each coupled element 100 provides one track of multi-track coupled element read head 300.

With prior art ferrite readers, the pressure used to ensure that closure piece 109 is adequately bonded to coupled elements 100 of read head 300 can cause element-to-element shorting between the MR sensor elements 103 and 106. This shorting is induced by extrusion of soft conductive material into those areas where such conducting material should not be present. To prevent such shorting, support structures composed of MR material are added in the spaces between coupled elements 100, providing for more evenly distributed pressure on coupled elements 100 as the closure piece is bonded to the chip.

Figure 4:
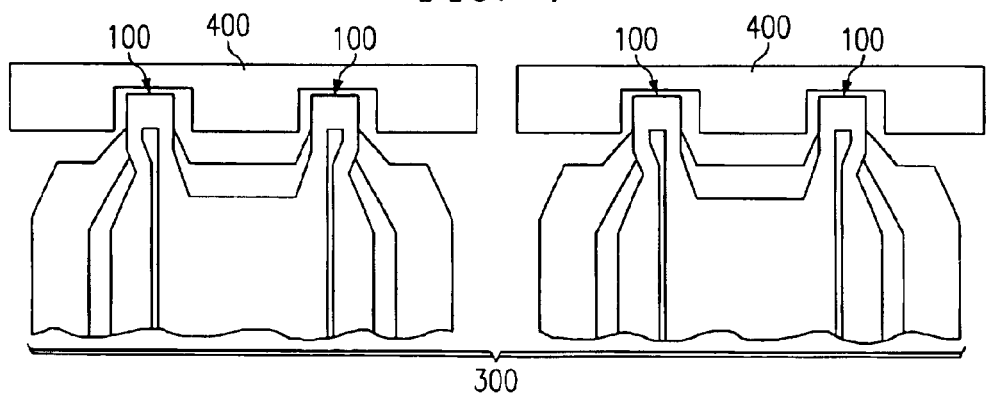
FIG. 4 depicts a top plan view schematic diagram illustrating a multi-track coupled-element read head with support structures in accordance with the present invention.

Referring now to FIG. 4, a top plan view schematic diagram illustrating a multi-track coupled-element read head with support structures is depicted in accordance with the present invention. As explained above, in ferrite shield read heads, support structures 400 are added in the spaces between coupled elements 100 in order to eliminate shorting between sensor elements (i.e. 103 and 106). In ferrite heads, the use of MR material for the support structures 400 is dictated by the desire to match the sensor thickness and for ease of processing.

In the present invention, the MR photo definition masks for the thin film shielded readers are modified to look like the MR photo masks used on ferrite reads. Like prior art ferrite read heads, the present invention also uses support structures 400, but for entirely different reasons. In the present invention, these structures 400 are added, not for physical support, but to provide additional magnetic fields, which change the magnetic environment the MR sensors experience during manufacture. Although the majority of this excess magnetic material gets lapped away during the machining portion of manufacturing, there will be a small rectangle of magnetic material visible at the tape interface (the surface that remains after the head is assembled). Typically, the support structures are made of NiFe capped with titanium (Ti). However, other material and combinations can be used, such as NiFe capped with tantalum (Ta), or a "sandwich" MR with Ta/NiFe/Ta.

When switching from the ferrite read head design to the new thin film shielded readers, there is no need for support structures 400 in order to prevent shorting. The thin film shields themselves are strong enough to prevent shorting when closures/additional parts are bonded to them during head assembly. Less pressure is applied during closing since the critical gap length is controlled by film processes rather than glue. Because of this, it was never considered that the additional structures used on ferrite heads be included with thin film heads.

For prior art ferrite read heads, the magnetic field from the support structures 400 does not have a significant effect on the MR sensor elements. However, the magnetic field from the support structures 400 has a significant stabilizing effect on the MR sensor elements of thin film shielded readers. By creating a more uniform magnetic field, the sensor domains remain more stable throughout processing. This additional, uniform magnetic field helps to eliminate domains that are perpendicular to the easy axis of the sensors 103 and 106. This improves both stability and amplitude asymmetry yields on dual stripe MR sensor readers.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for stabilizing magnetic domains in dual stripe magnetic read heads during manufacture, the method comprising:
   providing a plurality of coupled magneto-resistive read elements in a spaced relationship, wherein each coupled read element includes:
     a first patterned magnetic shield on a ceramic substrate;
     a first layer of magneto-resistive material;
     a second layer of magneto-resistive material;
     a second patterned magnetic shield with a ceramic substrate closure;
     insulating layers between each of the above-described components; and
   providing magnetic support structures adjacent and separated from the plurality of coupled read elements, wherein the support structures provide a uniform magnetic field that stabilizes the magnetic domains of the coupled read elements during manufacture.

2. The method according to claim 1, wherein the patterned magnetic shields are made of at least one of the following materials:
   cobalt zirconium tantalum;
   nickel iron;
   iron nitride; and
   sendust.

3. The method according to claim 1, wherein the ceramic substrate is made of aluminum titanium carbide.

4. The method according to claim 1, wherein a magnetic field provided by the magnetic support structures stabilizes the magnetic domains of the coupled read elements by eliminating magnetic domains that are perpendicular to the easy axes of the magneto-resistive layers in the read elements.

5. The method according to claim 1, wherein the support structures are made of nickel iron capped with titanium.

6. The method according to claim 1, wherein the support structures are made of nickel iron capped with tantalum.

7. The method according to claim 1, wherein the support structures are made of a sandwich of nickel iron between two layers of tantalum.

8. A dual stripe magnetic read head, comprising:
   a plurality of coupled magneto-resistive read elements in a spaced relationship, wherein each coupled read element includes:
     a first patterned magnetic shield on a ceramic substrate;
     a first layer of magneto-resistive material;
     a second layer of magneto-resistive material;
     a second patterned magnetic shield with a ceramic substrate closure;
     insulating layers between each of the above-described components; and
   magnetic support structures adjacent and separated from the plurality of coupled read elements, wherein the magnetic support structures provide a uniform magnetic field that stabilizes the magnetic domains of the coupled read elements during manufacture.

9. The magnetic read head according to claim 8, wherein the patterned magnetic shields are made of at least one of the following materials:
   cobalt zirconium tantalum;
   nickel iron;
   iron nitride; and
   sendust.

10. The magnetic read head according to claim 8, wherein the ceramic substrate is made of aluminum titanium carbide.

11. The magnetic read head according to claim 8, wherein a magnetic field provided by the magnetic support structures stabilizes the magnetic domains of the coupled read elements by eliminating magnetic domains that are perpendicular to the easy axes of the magneto-resistive layers in the read elements.

12. The magnetic read head according to claim 8, wherein the support structures are made of nickel iron capped with titanium.

13. The magnetic read head according to claim 8, wherein the support structures are made of nickel iron capped with tantalum.

14. The magnetic read head according to claim 8, wherein the magnetic support structures are made of a sandwich of nickel iron between two layers of tantalum.

* * * * *